United States Patent [19]

Casper et al.

[11] Patent Number: 5,025,458
[45] Date of Patent: Jun. 18, 1991

[54] APPARATUS FOR DECODING FRAMES FROM A DATA LINK

[75] Inventors: Daniel F. Casper, Poughkeepsie; John R. Flanagan, Staatsburg; Thomas A. Gregg, Highland; Catherine C. Huang, Poughkeepsie, all of N.Y.; Matthew J. Kalos, Tucson, Ariz.

[73] Assignee: International Business Machines Corporation, Armonk, N.Y.

[21] Appl. No.: 429,257

[22] Filed: Oct. 30, 1989

[51] Int. Cl.[5] ............................ H04L 7/02; H04J 3/06
[52] U.S. Cl. .................................. 375/114; 370/105.1; 371/47.1; 364/715.11
[58] Field of Search ................................ 375/114, 116; 370/105.1, 105.4; 364/715.11; 371/47.1

[56] References Cited

U.S. PATENT DOCUMENTS

| | | | |
|---|---|---|---|
| 4,203,003 | 5/1980 | Kline | 455/111 |
| 4,611,336 | 9/1986 | Fryer | 375/111 |
| 4,651,319 | 3/1987 | Bowlds | 370/105.1 |
| 4,674,088 | 6/1987 | Grover | 370/105.1 |
| 4,727,558 | 2/1988 | Hall | 375/116 |
| 4,779,268 | 10/1988 | Wissmann | 375/106 X |

Primary Examiner—Benedict V. Safourek
Assistant Examiner—Tesfaldet Bocure
Attorney, Agent, or Firm—Floyd A. Gonzalez

[57] ABSTRACT

An apparatus for decoding frames from a data link including a multiple entry expect/mask buffer an input for receiving multiple character frames, a comparator for comparing characters received from the data link with expected characters in the expect/mask buffer as masked by a mask also in the expect/mask buffer, a multiple entry header buffer for storing characters of frames received by the input, and a multiple entry compare buffer for storing in an entry the results of the comparison of the characters stored in the corresponding entry in the header buffer to expected characters as masked by the mask in a corresponding entry of the expect/mask buffer. Storage into the header buffer and the compare buffer is stopped by terminating events which are detected by a state machine. A data frame recognition circuit is provided which detects a variety of data frames from among the frames transmitted over the data link to the input of the apparatus.

13 Claims, 11 Drawing Sheets

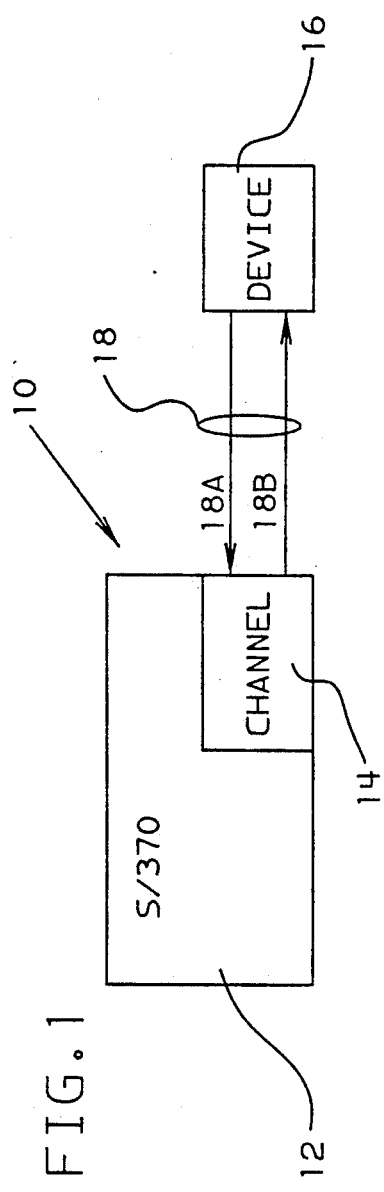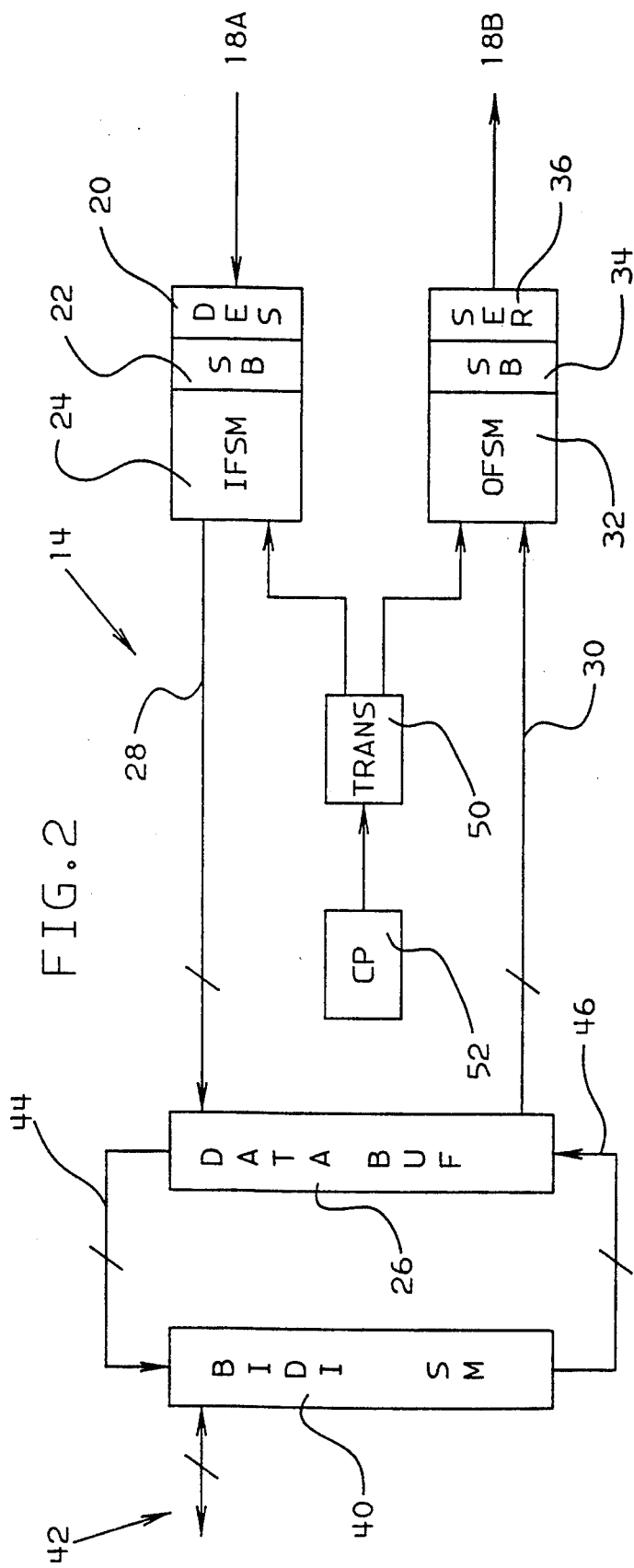

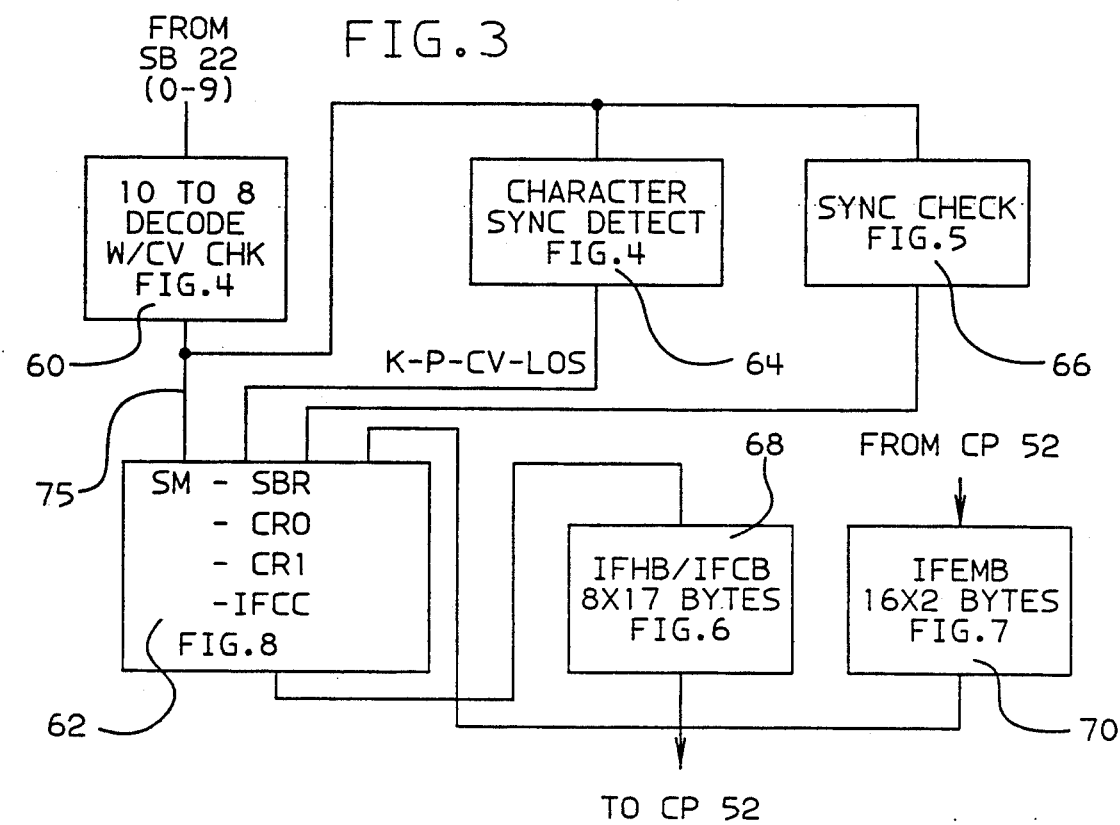
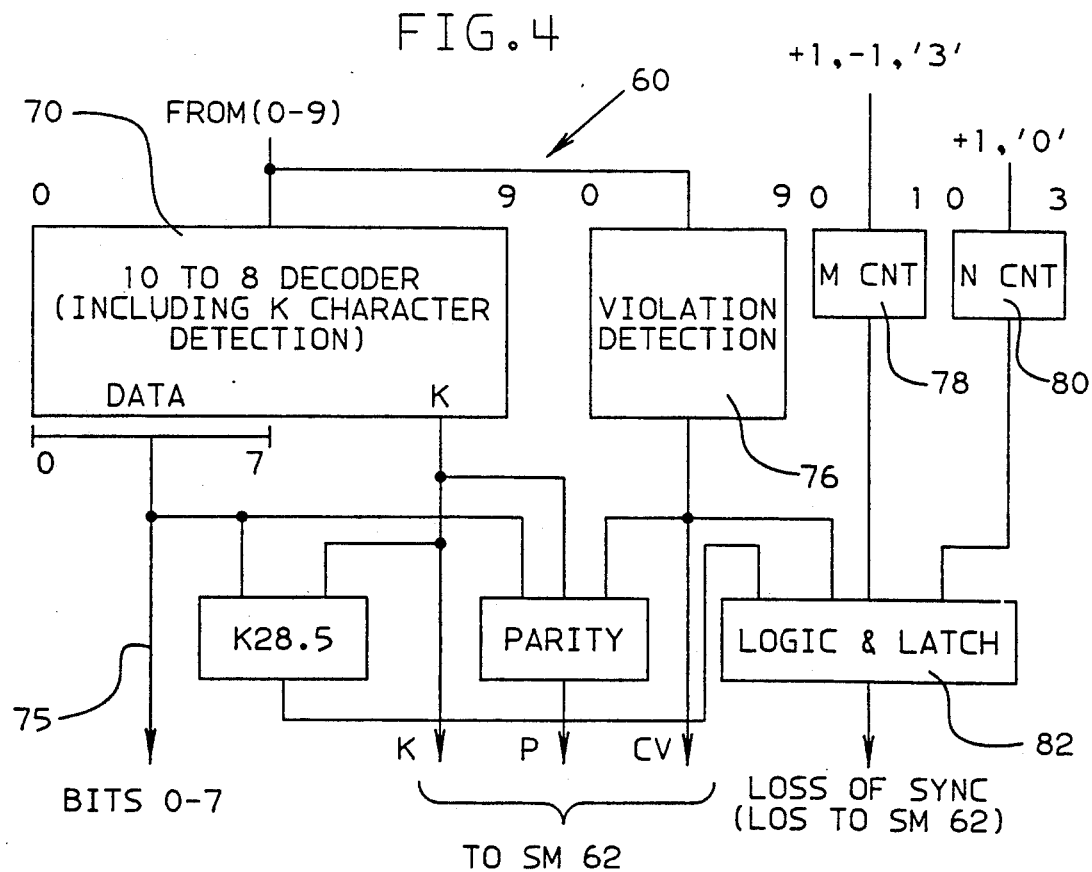

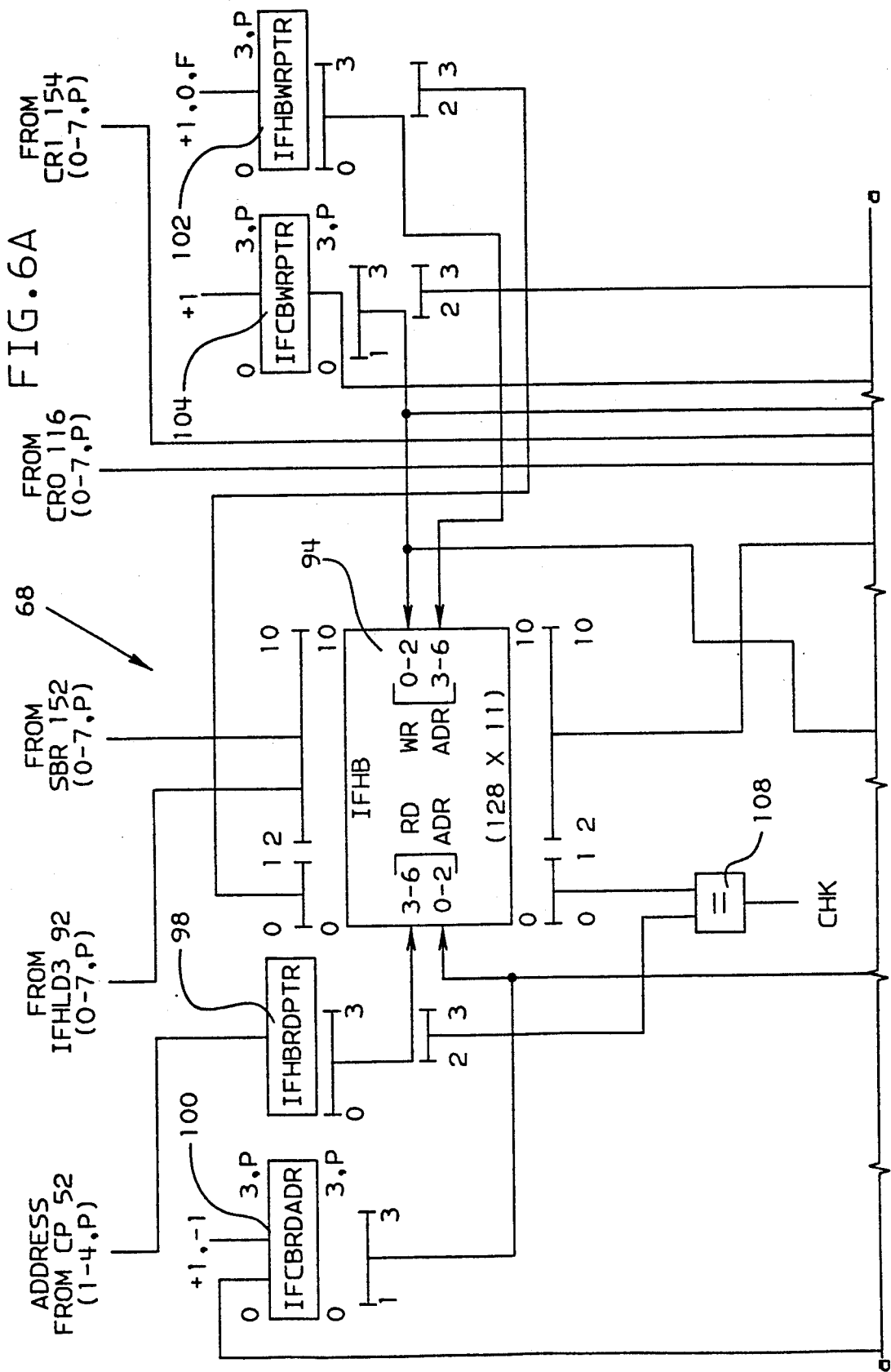

FIG. 9A

| INPUT \ STATE | DATA | 1ST SOF OR 2ND DEOF | 2ND PEOF | 2ND ABORT | IDLE | 1ST EOF OR ABORT | 2ND CSOF OR PSOF | CV | KUNDF | LOS |
|---|---|---|---|---|---|---|---|---|---|---|
| IDLE | CS-D 5 | CSOF1 6,7,12 | ERROR 6,8,12 | ERROR 6,8,12 | IDLE 1,6,7,13 | EOF1 6,8,12 | SOF2 1,2,6,7,13,15 | ERROR 6,9,12 | ERROR 6,10,12 | ERROR 1,6,14 |
| CS-D | ERROR 6,8,12 | CSOF1 6,7,12 | ERROR 6,8,12 | ERROR 6,8,12 | IDLE 12 | EOF1 6,8,12 | ERROR 6,8,12 | ERROR 6,9,12 | ERROR 6,10,12 | ERROR 1,6,14 |
| CSOF1 | ERROR 8,12 | CSOF1 8,12 | ERROR 8,12 | ERROR 8,12 | IDLE 8,12 | EOF1 8,12 | SOF2 1,2,13,15 | ERROR 9,12 | ERROR 10,12 | ERROR 1,14 |
| SOF2 | DATA 4,12 | CSOF1 4,8,12 | ERROR 4,8,12 | ERROR 4,8,12 | IDLE 4,8,12 | EOF1 4,8,12 | ERROR 4,8,12 | ERROR 9,12 | ERROR 4,10,12 | ERROR 1,14 |
| DATA | DATA 12 | CSOF1 8,12 | PEOF2 12 | AEOF2 12 | IDLE 8,12 | EOF1 12 | ERROR 8,12 | ERROR 9,12 | ERROR 10,12 | ERROR 1,14 |
| EOF1 | ERROR 8,12 | DEOF2 12 | ERROR 8,12 | ERROR 8,12 | IDLE 8,12 | EOF1 8,12 | ERROR 8,12 | ERROR 9,12 | ERROR 10,12 | ERROR 1,14 |
| DEOF2 | ERROR 8,12 | EOF3 1,3,13 | ERROR 8,12 | ERROR 8,12 | IDLE 8,12 | EOF1 8,12 | ERROR 8,12 | ERROR 9,12 | ERROR 10,12 | ERROR 1,14 |
| PEOF2 | ERROR 8,12 | CSOF1 8,12 | ERROR 8,12 | ERROR 8,12 | EOF3 1,3,13 | EOF1 8,12 | ERROR 8,12 | ERROR 9,12 | ERROR 10,12 | ERROR 1,14 |

| | | | | | | | | | | |
|---|---|---|---|---|---|---|---|---|---|---|
| AEOF2 | ERROR 8,12 | CSOF1 8,12 | ERROR 8,12 | EOF3 1,11,13 | IDLE 8,12 | EOF1 8,12 | ERROR 8,12 | ERROR 9,12 | ERROR 10,12 | ERROR 1,14 |
| EOF3 | ERROR 8,12 | CSOF1 12 | ERROR 8,12 | ERROR 8,12 | IDLE 12 | EOF1 8,12 | ERROR 8,12 | ERROR 9,12 | ERROR 10,12 | ERROR 1,14 |
| ERROR | ERROR 12 | CSOF 12 | ERROR 12 | ERROR 12 | IDLE 12 | EOF1 12 | ERROR 12 | ERROR 9,12 | ERROR 10,12 | ERROR 1,14 |

FIG. 9B

DATA = ANY VALID DATA CHARACTER

CV = ANY CHARACTER NOT CONFORMING TO THE 8/12 CODING RULES

KUNDF = ONE OF THE VALID K-CHARACTERS UNDEFINED BY THE ARCHITECTURE

LOS = LOSS-OF-SYNC CONDITION

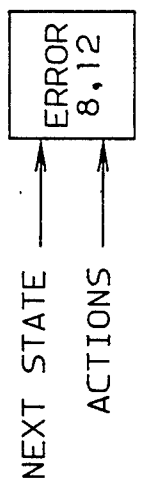

NEXT STATE ⟶ ERROR
ACTIONS ⟶ 8,12

APPARATUS FOR DECODING FRAMES FROM A DATA LINK

BACKGROUND OF THE INVENTION

The present invention relates to the transmission of data messages from a remote device to a data processing channel, and more particularly relates to an apparatus for decoding frames in data messages from a remote device to a data processing channel.

As is well known, data transmissions may be made from a remote device to a data processing channel wherein the data message is organized in frames having a header field and a trailer field. Devices are known which examine the header field to determine the type of message and contents of data in the data frame, and which examine the trailer field to identify the end of a frame or message.

U.S. Pat. No. 4,203,003 issued May 13, 1980 for "Frame Search Control for Digital Transmission System" to Kline, discloses a frame search control circuit which allows a comparison of up to N bits on the occurrence of each framing clock pulse while an out-of-frame conditions exists. The disclosed frame search control circuit stores the next N sequential bits for subsequent comparison, thus providing a fast reframe time.

U.S. Pat. No. 4,611,336 issued Sept. 9, 1986 for "Frame Synchronization for Distributed Framing Pattern in Electronic Communication Systems" to Fryer, discloses a frame bit synchronizer for a framing pattern sequence consisting of M bits distributed in a data bit stream as single bits at intervals of a fixed number N of bits, as measured from the start of one framing bit to the start of the next. The disclosed frame bit synchronizer includes counters which are cleared whenever a bit received is not the same as the next bit in the framing pattern sequence, and is incremented whenever a bit received is the same as the next bit in the framing pattern sequence. The count can be used as a threshold for determining when framing has occurred.

U.S. Pat. No. 4,651,319 issued Mar. 17, 1987 for "Multiplexing Arrangement with Fast Framing" to Bowlds, discloses a multiplexing arrangement for use in a digital communications system in which it is desired to multiplex plural user data inputs to a single serial digital communications channel, and then to decode the data to the appropriate user data outputs.

U.S. Pat. No. 4,674,088 issued June 16, 1987 for "Method and Apparatus for Detecting Frame Synchronization" by Grover, discloses a frame synchronization apparatus for detecting the framing pattern of a bit stream and producing a synchronizing slip in the absence of such detection.

U.S. Pat. No. 4,727,558 issued Feb. 23, 1988 for "Method and Apparatus for Extracting a Predetermined Bit Pattern from a Serial Bit Stream" to Hall, discloses locating an embedded frame bit pattern in a serial bit stream using a sliding compare circuit to determine, as each bit of the serial bit stream is received, if a predetermined number of prior bits in the serial bit stream which are spaced apart by the pitch of the framing bit pattern match part of the framing bit pattern.

U.S. Pat. No. 4,779,268 issued Oct. 18, 1988 for "Frame Decoding for Digital Signal Transmission" by Wissmann, discloses a method and apparatus for frame decoding in a system which has a series bit data flow with a frame structure including a periodically occurring item of synchronizing information which characterizes the start of each frame. A logic AND-link is performed with data in successive search frames until only one bit, the synchronizing bit, in the search frame is set at logic one and retained for a plurality of search frames.

SUMMARY OF THE INVENTION

The present invention relates to apparatus for decoding frames from a data link. The frames are bounded by a start of frame delimiter and an end of frame delimiter. The apparatus includes an expect/mask buffer, a first portion of which includes expected characters to be received from the data link, and a second portion which identifies which bits of the first portion are to be compared with data characters received from the data link. A multiple entry header buffer for storing characters of the frame, and a multiple entry compare buffer for storing the results of the comparison of the characters in the header buffer to the first portion of the corresponding entry in the expect/mask buffer as masked by the second portion of that entry. A data frame recognition circuit is also provided which may be programmed to detect a variety of data frames transmitted over the data link. Storage into the header buffer and the compare buffer is stopped by terminating events which are detected by a state machine.

It is therefore a primary object of the present invention to provide a frame detecting apparatus which detects the beginning, ending and data contained in frames transmitted over a data link.

It is also an object of the present invention to provide a frame detecting apparatus which includes an expect/mask buffer having a first portion containing expected characters to be received over a data link, and a second portion having a mask for indicating which bits of the expected character are to be compared with bits from the data link character.

It is also an object of the present invention to provide a multiple entry compare buffer wherein each entry contains the results of comparisons of expect/mask buffer entries to characters from the data link.

It is also an object of the present invention to provide a data frame recognition circuit capable of detecting a variety of data frames from among the frames transmitted over a data link.

The foregoing and other objects, features and advantages of the invention will be apparent from the following more particular description of the preferred embodiment of the invention as illustrated in the drawings.

BRIEF DESCRIPTION OF THE DRAWINGS

FIG. 1 is an overall view of a data processing system having a remote device, a data processing channel, and a link for transmitting data frames between the remote device and the data channel;

FIG. 2 is a block diagram of the data processing system of FIG. 1 including an inbound frame state machine circuit for decoding frames from the data link of FIG. 1;

FIG. 3 is a block diagram showing the data flow through the inbound frame state machine circuit of FIG. 2;

FIG. 4 is a block diagram of a 10 to 8 decoder circuit of the inbound frame state machine circuit of FIG. 3;

FIGS. 6A and 6B, joined along line a—a, form a block diagram of a buffer circuit of the inbound frame state machine circuit of FIG. 3, wherein the buffer circuit includes an inbound frame header buffer and an inbound frame compare buffer;

FIGS. 9A and 9B, joined along line c—c, form a state matrix diagram of the state machine of FIG. 8.

DESCRIPTION OF THE PREFERRED EMBODIMENT

Figure 5:
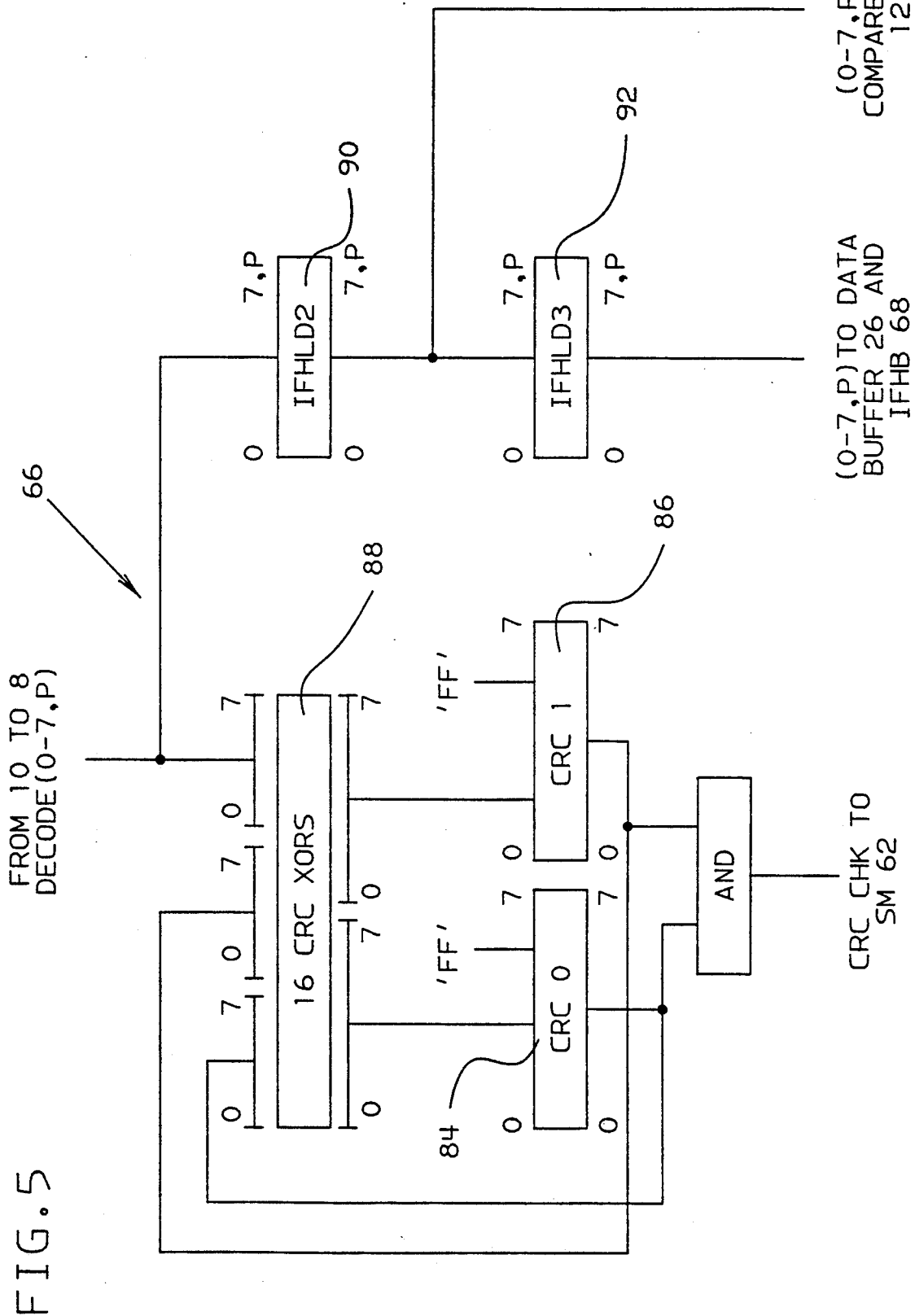
FIG. 5 is a block diagram of a cyclic redundancy code checking circuit of the inbound state machine circuit of FIG. 3.

FIG. 1 is an overall view of a data processing system 10 usable with the present invention. The data processing system 10 includes a computer 12 such as an IBM System/370 machine, which further includes one or more channels 14 having data input and output capabilities. The channel 14 is connected by a data link 18 to a device 16. In the preferred embodiment, the data link 18 includes an input conductor 18A for providing serial data transmissions from the device 16 to the channel 14, and an output conductor 18B which provides for serial data transmission from the channel 14 to the device 16. The device 16 may be a peripheral device, a control unit controlling several peripheral devices, or a switch device which provides for switching the data link 18 to anyone of a number of control units or devices.

FIG. 2 is a block diagram of the channel 14 of the data processing system of FIG. 1. The input conductor 18A provides serial data to a deserializer circuit 20 whose output is connected to an input synchronizer buffer 22. The synchronizer buffer 22 is connected to an inbound frame state machine (IFSM) 24. The synchronizer buffer 22 provides an interface between the deserializer circuit 20 and the inbound frame state machine 24 such that data may be received by deserializer circuit 20 at a different rate than it is processed by the inbound frame state machine 24. Data from the inbound frame state machine 24 is provided to a data buffer 26 over a multibit data bus 28. On the output side, data from the data buffer 26 is transmitted over a multibit data bus 30 to an outbound frame state machine 32, whose output is connected to an outbound synchronizing buffer 34. Data from the outbound synchronizing buffer 34 is provided to a serializer circuit 36, whose output is connected to the output conductor 18B of the data link 18. The data buffer 26 is connected to a bidirectional state machine 30 which controls data transfers between the system bus 42 of the System/370 machine 12 and the data buffer 26 over input and output intermediate data busses 44 and 46, respectively.

FIG. 3 is a block diagram showing the data flow through the inbound frame state machine circuit 24 of FIG. 2. Data from the inbound synchronizing buffer 22 shown in FIG. 2 is inputted into an 10 to 8 decoder 60 where it is decoded and checked for code violations. The 10 to 8 decoder circuit 60 decodes data characters in accordance with the coding rules of U.S. Pat. No. 4,486,739 to Franaszek et al, assigned to the Assignee of the present invention. From the decoder circuit 60, the data is inputted into a state machine 62, a character synchronization circuit 64 and a cyclic redundancy code check circuit 66. The character synchronization detect circuit 64 and the cyclic redundancy code check circuit 66 have outputs connected to the state machine 62. The state machine 62 has an output which controls the inbound frame header buffer and inbound frame compare buffer circuit 68 divided into 8 segments of 17 bytes each. An inbound frame expect mask buffer circuit 70 having 16 elements of two bytes each is provided for comparing an inbound frame to expected values, as will be explained. The state machine 62 contains multiple control registers including a summary byte register, a compare register 0 used for compare results, a compare register 1 used for error indicators, and an interface control check register used for additional error indicators. Each of the blocks of FIG. 3 identifies the figure number of the figure containing further block diagrams of the individual circuits.

FIG. 4 shows the details of the 10 to 8 decoder circuit 60 of FIG. 3. The decoder circuit 60 has a decoder section 74 which converts the 10 bit link characters into 8 data bits which are output to the data path at 75 and a K bit which indicates if the character is a special or K character, as explained in the aforementioned Franaszek patent. One special K character is used as an idle character to maintain the data link 18 in synchronism. The decoder section 60 also includes a code violation detection circuit 76 for detecting disparity errors and illegal code points of the data characters. Again, disparity errors are fully explained in the aforementioned Franaszek patent. Illegal code points are data characters which do not follow the coding rules of the aforementioned Franaszek patent, and are considered illegal. Also included in the decoding circuit 60 is a character synchronization detection section having an M counter 78 and an N counter 80 which are connected to a logic and latch circuit 82. The M counter 78 is a 2 bit counter which counts code violations. The N counter is a 4 bit counter which counts good characters or idle characters. A similar character synchronization detection circuit is described in an IBM Technical Disclosure Bulletin article "Character Synchronization Method" Vol. 28 No. 12 Page 5577 by L. Skarshinski (May 1986). The latch 82 provides a loss of sync indicator to the state machine circuit 62.

FIG. 5 is a block diagram of the cyclic redundancy code checking circuit 66 of FIG. 3. The circuit 66 checks a 2 byte cyclic redundancy code by the division of the data bytes with a check polynomial in the form:

$$X^{}15+X^{}12+X^{**}5+1$$

A CRC0 register 84 and a CRC1 register 86 are initiated by the state machine of circuit 62 at the beginning of a frame. As frame data bytes are received, they are Exclusive-ORed with the contents of the CRC registers 84 and 86 by an Exclusive-OR tree 88. The last two data bytes of frames are 2 cyclic redundancy code check bytes which have previously been generated from the data bytes of the frame and stored for transmission with the frame. These last two bytes are also passed through the Exclusive-OR trees 88. When the first character of the end of frame delimiter (to be explained) is received, the contents of the CRC register 84 and 86 should be 'FFFF'x if the CRC bytes included in the frame were correct.

An interface hold 2 register 90 and an interface hold 3 register 92 are used to delay the frame data by two bytes before it is stored into either the data buffer 26 of FIG. 2 or in the inbound frame header buffer, to be discussed. This delay prevents the cyclic redundancy code checking bytes from being stored in the arrays since the state machine of circuit 62 is examining the data as it leaves the decoder circuit 66 to give an appropriate delay to detect the end of frame.

Figure 6B:
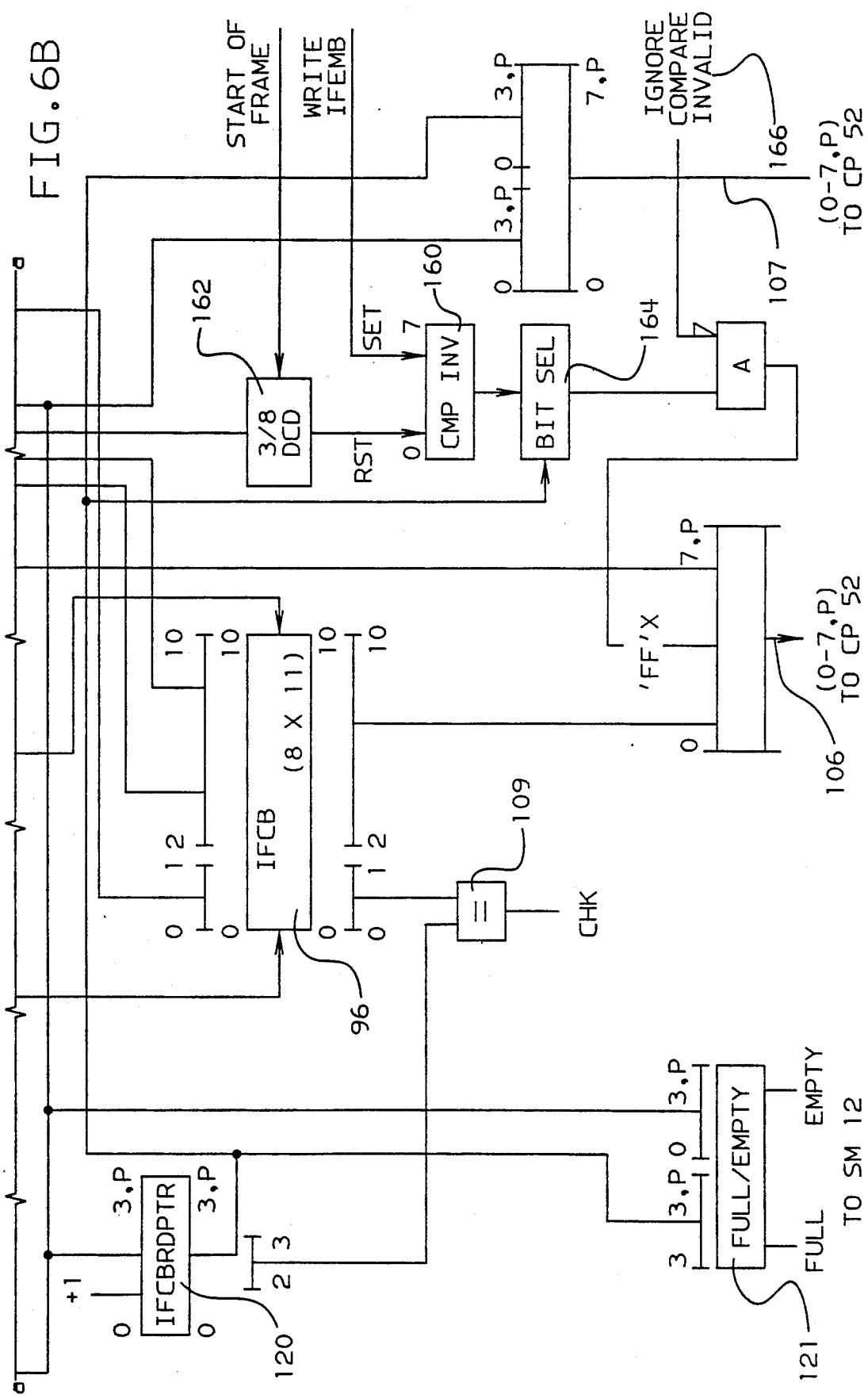

The inbound frame header buffer and the inbound frame compare buffer circuit 68 is shown in FIGS. 6A and 6B. The circuit 68 includes an inbound frame header buffer 94 and an inbound frame compare buffer 96. The header buffer 94 is a 128 by 11 bit dual port array used to store frames or frame headers and summary information. The compare buffer 96 is an 8 by 11 dual port array used to store header compare results or link error information. In both of the arrays 94 and 96, bits 0 through 2 are used for checking purposes and bits 3 through 10 are the 8 data bits. The header buffer 94 and compare buffer 96 operate in a circular fashion with the state machine circuit 62 writing the arrays and microcode of the channel processor 52 reading the arrays. The arrays 94 and 96 are logically divided into 8 segments. Each header buffer segment has 16 bytes, and each compare buffer segment includes 1 byte. An event terminator (to be described) occupies one segment of both arrays 94 and 96. The header buffer 94 and the compare buffer 96 share addressing registers. The pointer used for reading the arrays is exclusively controlled by the microcode of the channel processor 52, and is divided into two sections. The 4 low order bits are loaded in the in-bound frame header buffer read pointer 98 and are used to address one of the 16 elements within a header buffer segment. The high order bit of the address provided by the microcode is used to select either the header buffer 94 or the compare buffer 96 for reading. When the high order bit is active, the compare buffer 96 is selected. The 4 high order bits are stored in the inbound frame compare buffer read address register 100 in which bits 1 through 3 are used to address a particular segment in the header buffer 94 and compare buffer 96. The inbound frame compare buffer read address in the register 100 is incremented by microcode when the microcode steps to a new segment.

The pointer used for writing into the header buffer 94 and the compare buffer 96 is exclusively controlled by hardware of the state machine circuit 62. The pointer is also divided into two sections. The low order bits are stored in the in-frame header buffer write pointer register 102 and are used to address one of the 16 elements within a header buffer segment. The inbound frame header buffer write pointer in the register 102 is set to 0 at the beginning of frame reception and is incremented as frame information bytes are stored. The write pointer is set to 'F'x when the frame summary byte is written, as will be explained. The 4 high order bits are stored in the inbound frame compare buffer write pointer register 104 with bits 1 through 3 of this pointer used to address a particular segment in the header buffer 94 and compare buffer 96. The inbound frame compare buffer write pointer in register 104 is incremented as a result of a event terminator when the state machine circuit 62 wants to interrupt the microcode and step to the next segment.

The inbound frame compare buffer write pointer in register 104 is used with the inbound frame compare buffer read pointer in register 120 to determine the status of the header buffer 94 and the compare buffer 96. As microcode reads and processes entries in the arrays 94 and 96, it steps the inbound frame compare buffer read address in register 100 when it moves to the next segment. An inbound compare buffer read pointer 120 is provided for determining the fullness of the buffer arrays 94 and 96. Both register 100 and 120 are incremented by the channel processor 52. When the inbound frame compare buffer write pointer in register 104 is equal to the inbound frame compare buffer read pointer in register 120 as determined by comparator 121, the arrays 94 and 96 are empty and there is no work queued for the microcode. When the pointers are not equal, microcode is informed that there is queued work via an interrupt from comparator 121. The high order bit of the inbound frame compare buffer write pointer 104 and the inbound frame compare buffer read pointer (bit 0) is used for calculating the difference between completely full and completely empty arrays by comparator 121. In normal operation, the inbound frame compare buffer read pointer in register 120 is always equal to the inbound frame compare buffer read address 100. When the address in 100 is stepped, the hardware also steps the pointer in 120. When the microcode wants to empty the header buffer 94 and compare buffer 96 and discard their contents, it can set the inbound frame compare buffer read address in register 100 and the inbound frame compare buffer read pointer in register 120 to the value in the inbound frame compare buffer write pointer register 104.

Having 8 segments in the header buffer 94 and the compare buffer 96 provides a trace of the last 8 events on the inbound link 18A. When microcode logs these arrays, it reads the current segment and then decrements the read address in register 100 to read the next earlier segment. Microcode continues decrementing the read address in register 100, reading the arrays 94 and 96 until all 8 segments have been logged. The decrement of the read address in register 100 has no affect on the read pointer in register 120. During logging, the read pointer in register 120 must be left at its original value since it is used to determine the fullness of the arrays 94 and 96. After the microcode has logged all 8 segments, it is responsible for decrementing the read address in register 100 eight more times in order to make the read address in register 100 equal to the read pointer in register 120. Microcode can also read the values of the inbound frame compare buffer write pointer in register 104 and the inbound frame compare register read pointer in register 120 via terminal 107 to determine the fullness of the arrays 94 and 96 during logging. This function is important since the state machine of the circuit 62 is allowed to run during logging.

The data input to the header buffer 94 are the output of the interface hold 3 register 92 of FIG. 5 and a summary byte register 152 to be discussed in connection with FIG. 8. The data inputs to the compare buffer 96 are the compare register 0 116 of FIG. 7B and compare register 1 154 of FIG. 8. The data outputs from both the header buffer 94 and compare buffer 96 arrays are connected to an output 106 for providing data to the channel processor 52. A value of 'FF'x can be forced to the channel processor 52 during a read of the compare buffer 96 over output terminal 106. This function will be described in connection with FIGS. 6A and 6B.

As earlier mentioned, bits 0 through 2 of the header buffer 94 and compare buffer 96 are used for error checking of both the arrays 94 and 96 and their read/- write addresses. Bits 0 and 1 of these arrays are written with their respectively low order write address bits. When the arrays 94 and 96 are read, these bits are compared to the corresponding read address bits by comparators 108 and 109, respectively. If the bits miscompare, an array error is detected. Header buffer bits 0 and 1 are written from the header buffer write pointer bits 2 and 3 in register 102, and they are compared with the header buffer read pointer bits 2 and 3 by comparator 108. Compare buffer bits 0 and 1 are written from compare buffer write pointer bits 2 and 3, and they are compared to the compare buffer read pointer bits 2 and 3 by comparator 109. The checking is inhibited during array logging, and all array bits are recorded. It will be noted that the compare buffer bits are compared to the inbound frame compare buffer read pointer bits of register 120 rather than the inframe compare buffer read address bits of register 100. This feature checks that the compare read pointer and compare read address in registers 120 and 100 are equal during normal operation. Bit 2 of the arrays 94 and 96 is the Exclusive-OR of the data parity and the address parity (not shown). The header buffer bit 2 input is the Exclusive-OR of the data, the inbound frame header buffer write pointer, and the inbound frame compare buffer write pointer parities; and the bit 2 output is Exclusive-ORed with the inbound frame header buffer read pointer and the inbound frame compare buffer read address parities (not shown) to predict the data parity. The compare buffer bit 2 input is the Exclusive-OR of the data and the inbound frame compare buffer write pointer parities; and the bit 2 output is Exclusive-ORed with the inbound frame compare buffer read address parity (not shown) to predict the data parity. Note that since the segment pointers in registers 104 and 100 contain a high order wrap bit, the array parity is inverted each pass through the arrays. This feature detects when the microcode tries to read a segment or element which has not been previously written by the state machine of circuit 62.

Figure 7A:
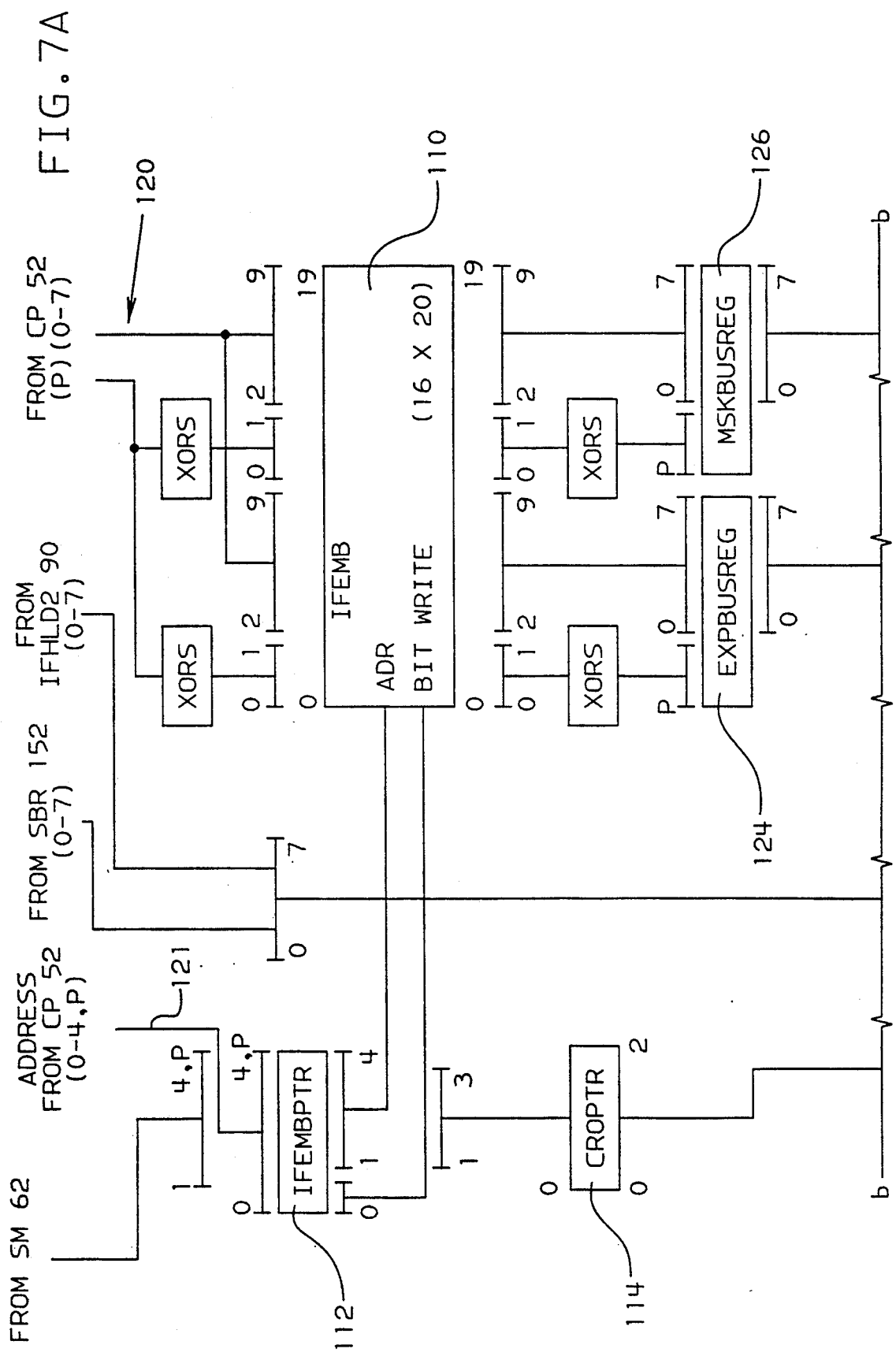
FIGS. 7A and 7B, joined along line b—b, form a block diagram of a compare circuit of the inbound frame state machine circuit of FIG. 3, wherein the compare circuit includes an inbound frame expect/mask buffer and a data frame detecting circuit.
Figure 7B:
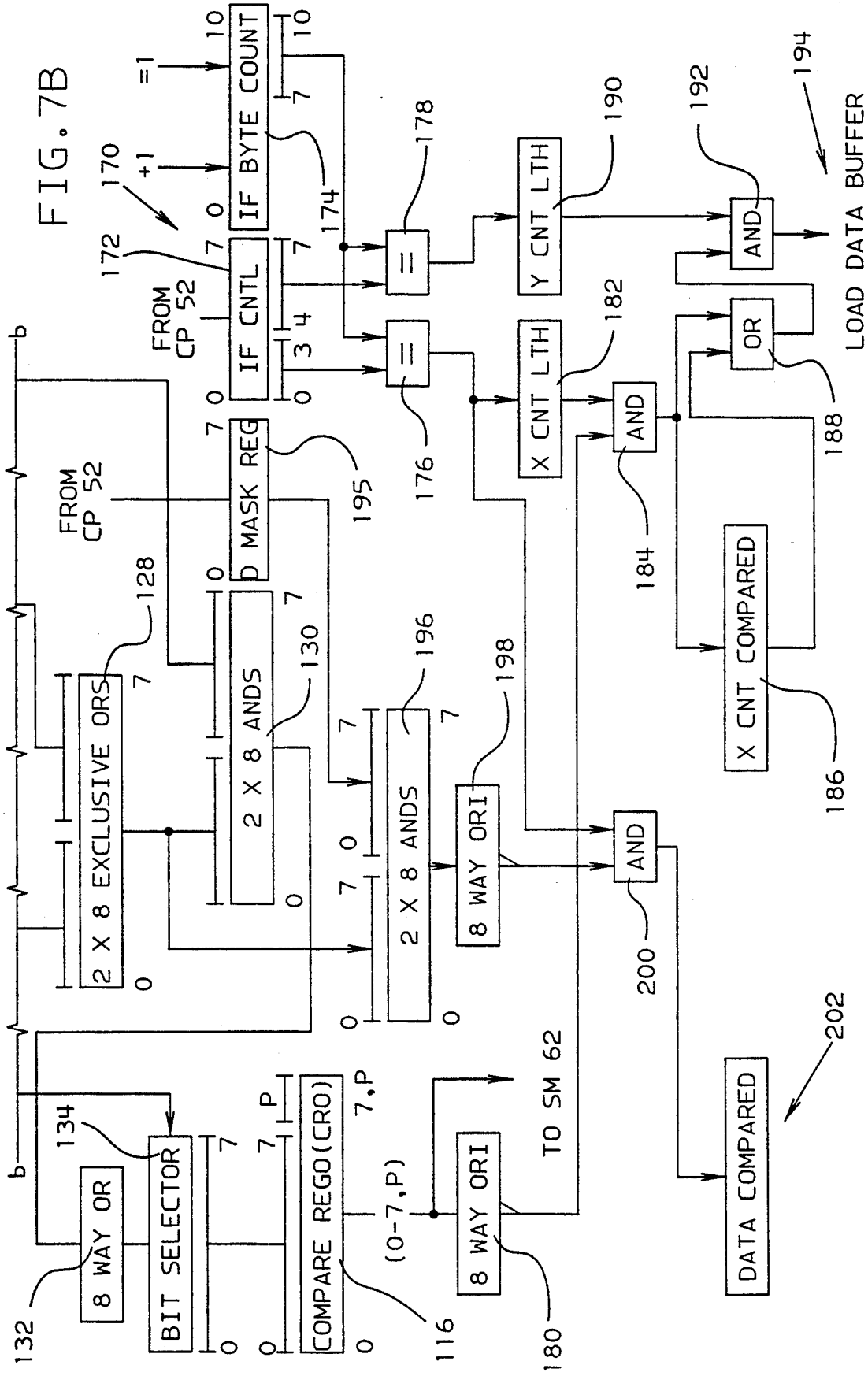

FIGS. 7A and 7B form a block diagram of compare hardware of circuit 70 which includes an inbound frame expect/mask buffer 110. The compare circuit 70 compares the contents of the first 15 bytes of inbound frames and the frame summary byte. The circuit 70 is most useful during read operations when frames are received too quickly for microcode to examine each header character of every frame. The circuit 70 includes the inbound frame expect/mask buffer 110, an inbound frame expect/mask buffer pointer 112 for storing the address pointer, a compare register 0 pointer 114, a compare register 0 116, and a maskable byte-wide comparator formed by an OR circuit 128 and AND circuit 130, as will be explained.

The expect mask buffer 110 is a 16 by 20 bit single port array with bit write capability. The array bits 2 through 9 and 12 through 19 are used for data, and bits 0, 1, 10 and 11 are used for error checking. The microcode of channel processor 52 loads the expect/mask buffer 110 via input terminal 120, and supplies an address via terminal 121 to the expect/mask buffer pointer register 112. The expect/mask buffer pointer bits 1 through 4 address 1 of the 16 elements of the array 110, and bit 0 is used as a bit write select. When bit 0 is 0, bits 0 through 9 are written into the array 110 as expect bits, and when bit 0 is 1, bits 10 through 19 are written into the array 110 as mask bits. Each microcode load operation takes two cycles, and the load operations can be overlapped. Because the expect/mask buffer 110 is a single port array, the microcode has priority over the state machine of circuit 62 when accessing the array 110. When both the state machine of circuit 62 and the microcode are addressing the array 110 at the same time, the compare invalid hardware of FIGS. 6A and 6B, to be described, is used to keep track of the validity of the compare bytes.

The expect/mask buffer 110 is read by the state machine of circuit 62 as frames are being received. When a start of frame delimiter is detected, the expect mask buffer pointer bits 1 through 4 are set through 0, and all 8 bits of the compare register 0 116 are reset. The array element at this address is read into an expect bus register 124 and mask bus register 126. In the same cycle, expect mask buffer pointer bits 1 through 3 are loaded into the compare register 0 pointer register 114. This pointer is used as an index into the control register 0 register 116 to determine which bit should be set. Since the compare results for two frame bytes are recorded in each bit of the control register 0 116, only three bits of the expect/mask buffer pointer need be loaded into the compare register 0 pointer of register 114. The compare results for frame bytes 0 and 1 are loaded in compare register 0 bit 0, the results of bytes 2 and 3 are loaded into compare register 0 bit 1, and so forth. In the following cycle, an Exclusive-OR circuit 128 and AND circuit 130 process data from expect bus register 124, mask bus register 126, the inbound frame hold 2 register 90 of FIG. 5, and the control register 0 pointer 114 to determine the setting of the appropriate bit in control register 0 116. The polarity of the expect portion of the expect/mask buffer 110 is the same as the frame itself, and ones in the mask portion indicate that the corresponding frame bit is to be compared to the expect bit. If all bits of the frame data byte compare to the masked expect bits, then its corresponding bit in the control register 0 116 bit is left reset, and if any bit miscompares, its corresponding bit is turned on. The comparison and bit selections are made by an 8 way OR gate 132 and bit selector 134. As frame bytes are received, the expect/mask buffer pointer in register 112 is incremented, and the compare process is pipelined through the hardware as described. When the end of frame delimiter is detected, or the end of frame header has been reached, the expect/mask buffer pointer in register 112 is forced to 'F'x. The expect/mask buffer element at this address contains the compare parameters for the summary byte 152 to be discussed in connection with FIG. 8. At the same time that the summary byte is being written into the header buffer 94 of FIG. 6, it is compared to the expect bus register 124 and mask bus register 126 by circuits 128 and 130.

Error detection for the expect/mask buffer 110 consists of four parity bits for each element. Bits 0 and 1 have the same implementation as bits 10 and 11. The array input to bit 0 is the Exclusive-OR of the data parity, the even numbered data bits, and the expect/mask buffer pointer parity, and bit 1 is the Exclusive-OR of the data parity and the odd numbered data bits. When the expect/mask buffer 110 is read, the bits are checked for correct parity, and the data parity is predicted. This checking is used to detect addressing errors and multiple adjacent bit array errors.

A compare register 0 error detection uses parity prediction. When the compare register 0 register 116 is set to 0, the parity bit is set to 1. As a frame is received, the parity bit is complemented if a byte miscompares. This complement is inhibited when the compare register 0 bit is already 1.

The circuit of FIGS. 7A and 7B includes a data frame recognition circuit 170 which includes an inframe control register 172 which is divided into two sections. The first section may be loaded by the channel processor 52 with an X count value, and the second section may be loaded by the channel processor 52 with a Y count. The X count represents the number of header bytes in a data frame, and the Y count represents the length of the entire header of the data frame. It will thus be understood that the data frame recognition circuit 170 may be used to detect a variety of different data frames having different numbers of header bytes and header lengths. For instance, some data frames may have a header of only header bytes, in which case the X and Y counts will be equal. Other data frames may have headers which include header bytes and other bytes containing other parameters. In that case, the X count will be smaller than the Y count, with the difference being the number of other bytes in the header.

An inframe byte counter 174 is included which counts the number of frame bytes recieved. As a frame is received, the state machine circuit 62 compares the header bytes with the expect/mask buffer 110 as described. Comparitors 176 and 178 are provided the compare the count of the byte counter 174 with the X count and the Y count, respectively. If all of the header bytes compare up to, and including, the byte specified by the X count, and bits 0 and 2 through 7 of the summary byte, as determined by an 8 way OR invert gate 180, the frame header has passed the compare test and the frame is a data frame. When the number of data bytes received equals the Y count, the entire header has been received, and the state machine circuit 62 stops loading the header buffer 94. The remaining data characters except CRC are the I/O data, which are loaded by the state machine circuit 62 in the the data buffer 26 if there are no errors detected (summary byte bit 2 is 0, as will be explained). The output of the comparitor 176 is latched into latch 182, whose output is ANDed with the output of OR gates 180 by AND gate 184 and latched by an X count compared latch 186. The output of the AND gate 184 is ORed with the output of latch 186 by an OR gate 188, whose output is ANDed with the output of a Y count latch 190 by AND gate 192. The output of the AND gate 192 is a LOAD DATA BUFFER signal at 194, which instructs the state machine circuit 62 to load the I/O data into the data buffer 26. It will be understood that in the circuit 170, the LOAD DATA BUFFER signal will not come on until after the X count and the Y count, and then only if there was an equal compare signal from Or gates 180 at the last byte of the X count. If the frame does not pass the compare test, the frame is handled as a control frame, and the state machine circuit 62 loads all the data characters except the CRC characters into the header buffer 94. If there are more than 15 data characters, the remaining characters are discarded and the MAX2 indicator is set, as will be explained.

The frame header bytes from after the X count to the Y count are compared to the values in the expect/mask buffer 110 for detecting only those parameters in the X count to Y count bytes which require attention by the channel processor 52.

If errors are detected within the frame and after the end of header, as determined by the Y count, or if the end of frame delimiter does not compare to the value in the expect/mask buffer 110 at address 'F'x, a header buffer 94 and compare buffer 96 entry is made and the segment write pointer 102 is incremented. Summary byte bit 3, to be explained, is set indicating that the error or miscompare occurred after the Y count was reached, and it also indicates that the previous entry may have been for the same frame.

In some data frame structures, parameters are sent in one of the data frame header bytes which indicate that the frame is a data frame. In that case, a DMASK register 195 is provided in the circuit 170 to be used to mask the expect portion of the expect/mask buffer by a 2 by 8 AND gate 196 for comparison with the incoming byte from the hold 2 register 90 of FIG. 5 by an 8 way OR invert gate 198. When the described compare is for the Xth byte, as determined by an AND gate 200, a data frame has been detected. Upon the detection of a data frame, a DATA COMPARED signal at 202 is turned on so that at end of header, as determined by the Y count, the header buffer 94 and compare buffer 96 may be incremented in the same way as previously described. As before, a miscompare of a header byte before the Y count is reached, causes the segment write pointer in 102 to be incremented for the header buffer 94 and the compare buffer 96.

The microcode has priority over the state machine of circuit 62 when writing the expect/mask buffer 110. Since frames may be arriving while the expect/mask buffer 110 is being updated, there are times when the results of the compare process are not valid. An 8 bit compare invalid register 160 of FIG. 6B is used to keep track of which of the 8 entries in the compare buffer 96 are invalid.

Each time the microcode writes to the expect/mask buffer 110, all bits in the compare invalid register 160 are set to ones. This condition indicates that all 8 compare buffer entries are invalid. Each time a start of frame is detected and the first element of the expect/mask buffer 110 is read, the corresponding compare invalid bit in 160 is reset by a 3 to 8 decoder 162. The compare buffer write pointer bits 1 through 3 in register 104 of FIG. 6A are used as an index to determine which compare invalid bit is reset. As a result, the action of the compare invalid register 160 is to synchronize the updates of the expect/mask buffer 110 to events on the inbound link 18A. When microcode reads the compare buffer 96 the compare buffer read pointer bits 1 through 3 in register 120 are used as an index to the compare invalid register 160. If the compare invalid bit selected by a bit selector 164 is 1, the compare results are invalid, and the outputs of the compare buffer 96 are forced to 'FF'x over terminal 106. A 'FF'x value indicates that none of the frame bytes or summary byte compared equal to the expect/mask buffer 110. When the summary byte bit 2 is 1, the compare buffer 96 contains error information. In this case, the microcode can override the effect of the compare invalid register 160 and read the actual contents of the compare buffer 96. To override the compare invalid register 160, microcode must turn on an ignore compare invalid bit 166.

Error detection of the compare invalid register 160 uses a parity bit. This bit is set to 1 when the compare invalid register 160 is set to 'FF'x. Each time the hardware tries to reset a compare invalid bit, the parity bit is complemented if the bit to be reset is 1. In this way, the parity over the compare invalid register 160 and its parity bit are always odd.

Figure 8:
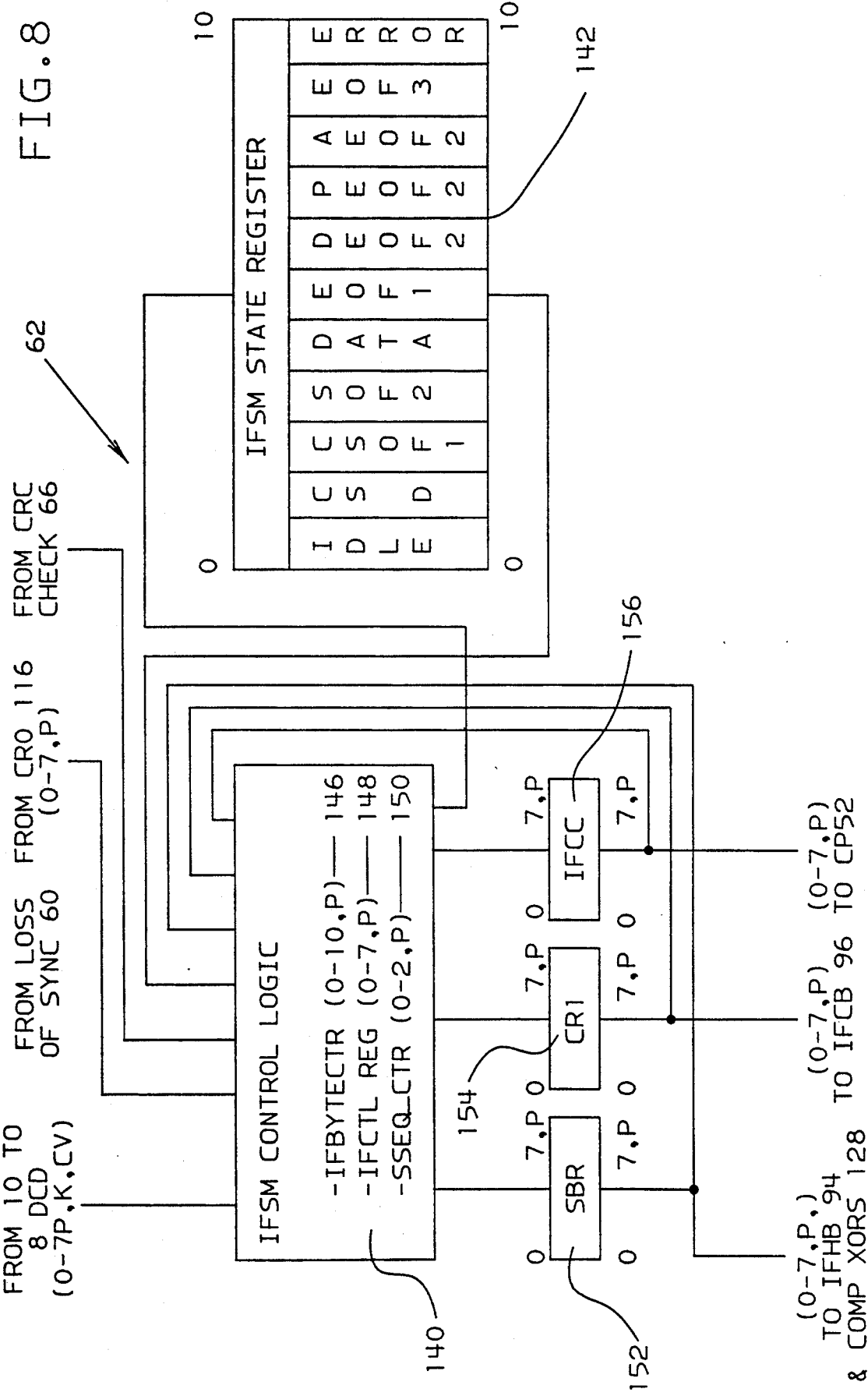
FIG. 8 is a block diagram of a state machine circuit of the inbound frame state machine circuit of FIG. 3.

FIG. 8 is a block diagram of the state machine circuit 62 of FIG. 3. The state machine circuit 62 contains a state machine 140 and includes an 11 bit state register 142 which has 1 bit per state. A checker (not shown) is used to check that 1 and only 1 bit is turned on in the state register 142 for error detection. The state machine 140 includes an inbound frame byte counter 146 (which may be the same counter as 174 in FIG. 7B), an inbound frame control register 148 and a continuous sequence counter 150. The state machine 140 also controls the summary byte register 152, the compare register 1 154 for storing an alternate compare byte 154, and an interface control check register 156. The following event terminating conditions are detected by the state machine 140: a Start of Frame delimiter was received, an End of Frame delimiter was received, an Abort delimiter was received, a pair of idle characters were received, eight consecutive pairs of consecutive sequences were received, a maximum event (MAX EVENT RECOGNIZED) condition was reached, or a Loss of Sync condition was detected. The bits and their definitions for the summary byte, the alternate compare byte and the interface control check byte are as follows:

| SUMMARY BYTE DEFINITION (Address 'F'x) | |
|---|---|
| Bit 0 | Start of Frame delimiter type:<br>0 = Passive<br>1 = Connect |
| Bit 1 | End of Frame delimiter type:<br>0 = Passive<br>1 = Disconnect |
| Bit 2 | Alternate Compare: When this bit is off, the IFCB 96 (address '10'x) contains frame compare information. The IFCB was written from CR0 116 for this entry. When this bit is on, the IFCB 96 contains information which describes an error event on the link 18A. In this case, the IFCB 96 was written from CR1 154, and bit 7 of the IFCB 96 is always on. |
| Bit 3 | After EOH (End of Header): This bit is used only during READ data transfer operations. When it is on, it indicates a condition detected within a frame after the header count was reached. The first case is a miscompare of the EOF (End of Frame) delimiter. If Expect/Mask conditions for the EOF were not met, bit 1 of the summary byte (address 'F'x) indicates the type of delimiter received. The second case occurs with summary byte bit 2 (Alternate Compare) on. In this case, the IFCB 96 contains error information as described under summary byte bit 2. These two cases can occur either separately or together. |
| Bits 4–7 | Header Length: These bits indicate the length of the frame header or the number of information bytes in the entire frame (1 to 15) UNLESS summary byte bit 2 (Alternate Compare) is on and IFCB 96 bit 4 (SEQCK, UK or CV to be described) is also on. When these two bits are on, summary byte bits 4 through 7 describe the type of error as follows: |
| Bit 4 | Character Sequence Check (SEQCK) Detected |
| Bit 5 | Undefined/Unused K Character (UK) Detected |
| Bit 6 | Code Violation Count (CU) Bit 0 |
| Bit 7 | Code Violation Count (CU) Bit 1 (A count of 3 indicates that 3 or more Code Violations were detected within this EVENT). |

| ALTERNATE COMPARE BYTE DEFINITION (Address '10'x) (CR1) | |
|---|---|
| Bits 0–3 | Error Encode: |
| F - SYNC | Loss of Character Sync was detected. |
| E - CONTSEQ | A Continuous Sequence has been Received. Eight consecutive pairs (back to back) of the Idle character and a Data character have been received. The Data character received is stored in element 0 of the IFHB 94 (address '0'x). (see IFCC Register 156 bit 2) |
| D - MAX1 | A MAX EVENT was detected (see IFCC Register 156 bit 3). |
| C - ABORT | An Abort End of Frame Delimiter was received. |
| B - SOFTERM | The present EVENT was terminated by the receipt of a Start of Frame delimiter. |
| A - MIN | The frame had 0, 1 or 2 Data characters between Start and End of Frame delimiters. |
| 9 - CRC | Bad CRC was detected in this frame. |
| 8 - MAX2 | A frame was received which was not a data frame and had more that 15 bytes in the information field. |
| 7 - ZERO | A zero length Data frame was received. |
| 6 - CNT=0 | A frame containing data was received which was not expected. (see IFCC Register 156 bit 6) |
| 5 - SDBOVRN | Data was received when the data buffer 26 was full. (see IFCC Register 156 bit 7) |
| 4 - DIBCK | The amount of data received within 1 frame was larger than specified. |
| 0 - NULL | The error condition is none of the above. |
| Bit 4 | SEQCHK, UK, CV: A Character Sequence Check, Undefined/Unused K Character, or Code Violation was detected. When this bit is on, Summary byte bits 4 through 7 specify the error, as described. |
| Bit 5 | Start of Frame Valid: When this bit is off, the event did not have a valid Start of Frame delimiter. When it is on, the event started with a valid Start of Frame delimiter. |
| Bit 6 | End of Frame Valid: When this bit is off, the event did not terminate with a valid End of Frame delimiter. When it is on, the event terminated with a valid End of Frame delimiter (NOT Abort). Note, during READ data transfer, if the event is at End of Header time, this bit will not be set. |
| Bit 7 | This bit is always on when the Summary byte bit 2 is on. (see Summary byte 2 above) |

| IFCC REGISTER DEFINITION | |
|---|---|
| Bit 0 | Loss of Signal (or Signal/Modulation): This bit follows the state of the loss of signal detection on the link 18A. It is set and reset by hardware. |
| Bit 1 | Loss of Sync: This bit follows the state of the character sync logic (shown in FIG. 4). It is set and reset by hardware. (see Alt. Cmp. Encode 'F'x) |
| Bit 2 | Continuous Sequence: This bit is set by the SM 140 when a Continuous Sequence is recognized. It is reset by the IFSM 140 when the Continuous Sequence ends. It is also reset by the channel processor 52. (see Alt. Cmp. Encode 'E'x) |
| Bit 3 | Max Frame Size 1 Error: This bit is set by the SM 140 when a MAX1 error is recognized. It is reset by the SM 140 when the condition ends, and it is also reset by the channel processor 52. (see Alt. Cmp. Encode 'D'x) |
| Bit 4 | Header Buffer Overrun: This bit is set by the SM 140 when the IFHB 94/IFCB 96 is full and another entry is attempted (an EVENT TERMINATOR). This bit on causes an interrupt to the channel processor 52. This bit is reset by the channel processor 52. |
| Bit 5 | Microcode: This bit is set by microcode of the channel processor 52. This bit on causes an interrupt. This bit is reset by the channel processor 52. |
| Bit 6 | Request Count Overrun: This bit is set by hardware when the state machine 140 detects that more data is received than expected. |

-continued

| | |
|---|---|
| | When this bit is on, additional data is inhibited from being written into the data buffer 26. This bit is reset by the channel processor 52. (see Alt. Cmp. Encode '6'x) |
| Bit 7 | Data Buffer 26 Overrun: This bit is set by hardware when the data buffer 26 is full and the hardware attempts to write more data into this buffer from the data link. When this bit is on, additional data is inhibited from being written into the data buffer 26. This bit is reset by the channel processor. (see Alt. Cmp. Encode '5'x) |

FIG. 9 is a state matrix for the state machine 140 of FIG. 8 which shows the state of the state machine 140 and the actions that are taken dependent upon the input to the state machine. The state of frame and end of frame delimiters detected by the inbound frame state machine circuit 24 are described in U.S. patent application Ser. No. 07/429,267 filed Oct. 30, 1989 for "Dynamic Connections" by Brown et al, assigned to the Assignee of the present invention. Among those delimiters detected are a connect start of frame (CSOF), passive start of frame (PSOF), a disconnect end of frame (DEOF) and a passive end of frame (PEOF) delimiters. The circuit 24 also detects abort sequences. The first 7 columns of the state matrix table of FIG. 9 shows the next state of the state machine 140 and the actions to be taken when the state machine 140 is in the state of the first column and the data character at the head of each column is received. It will be noted that for the second column, the K character is identical for the first character of a start of frame delimiter and the second character of a disconnect end of frame delimiter.

The states for the state matrix table of FIG. 9 are defined as follows:

| | |
|---|---|
| IDLE | The idle state. At least one idle character has been received. |
| CS-D | Continuous Sequence Data state. A data character following an idle character has been received. |
| CSOF1 | The first character of a connect SOF delimiter has been received. |
| SOF2 | A character which was preceded by either a connect SOF or passive SOF character has been received. |
| DATA | The DATA state. This state is entered from SOF2, and is maintained as long as data characters are being received. |
| EOF1 | The first character of an EOF delimiter or ABORT sequence, has been received. |
| DEOF2 | The second character of a disconnect EOF delimiter, has been received. |
| PEOF2 | The second character of a passive EOF delimiter, has been received. |
| AEOF2 | The second character of an ABORT sequence, has been received. |
| EOF3 | A Passive EOF sequence, a Disconnect EOF sequence, or an ABORT Sequence has been received. |
| ERROR | Entered after certain error conditions. This state is identical to the EOF3 state, except that no sequence checks are set. This avoids a sequence check being falsely reported with a code violation. The IFSM is initialized to this state. |

The action entries for the state matrix table of FIG. 9 are defined as follows:

1. Event Terminate: Terminate the event in progress, if any. Report the state of the indicators, and reset the indicators as appropriate. No action is taken if no event is in progress.
2. Set SOF TYPE: Set the SOF TYPE indicator according to the current state. Setting SOF TYPE marks the beginning of an event.
3. Set EOF TYPE and EOF VALID: Set the EOF TYPE indicator according to the current state, and set the EOF VALID indicator.
4. Set SOF VALID: Set the SOF VALID indicator.
5. Check Continuous Sequence: Execute the Check Continuous Sequence routine defined in FIG. 10.
6. Reset CS COUNTER, CS-IN-PROGRESS, and CS RECOGNIZED: Reset the CS COUNTER and the two internal indicators.
7. Conditional Sequence Check: Set the SEQUENCE CHECK indicator CS-IN-PROGRESS in on and CS RECOGNIZED is off.
8. Set SEQUENCE CHECK: Set the SEQUENCE CHECK indicator.
9. Set CODE VIOLATION: Set the CODE VIOLATION indicator.
10. Set UNDEFINED KCHAR: Set the UNDEFINED K CHARACTER indicator.
11. Set ABORT: Set the ABORT indicator
12. Increment CHARACTER COUNTER: No-Op if EITHER the CS RECOGNIZED OR the NAX EVENT RECOGNIZED indicator is set. If both of these indicators are reset, increment the CHARACTER COUNTER and check it for maximum. If maximum, set the MAX EVENT DETECTED and MAX EVENT RECOGNIZED indicators, and terminate the event.
13. Reset CHARACTER COUNTER and MAX EVENT RECOGNIZED: Reset the CHARACTER COUNTER and the internal indicator.
14. Set LOS: Set the LOSS-OF-SYNC indicator.
    Note: Once a Loss-of-Sync condition is reported, the ERROR state is maintained, all indicators and facilities are held reset, and no further events are recognized until the Loss-of-Sync condition is removed.
15. Set SOF TERMINATE: Set the SOF TERMINATE indicator.

Figure 10:
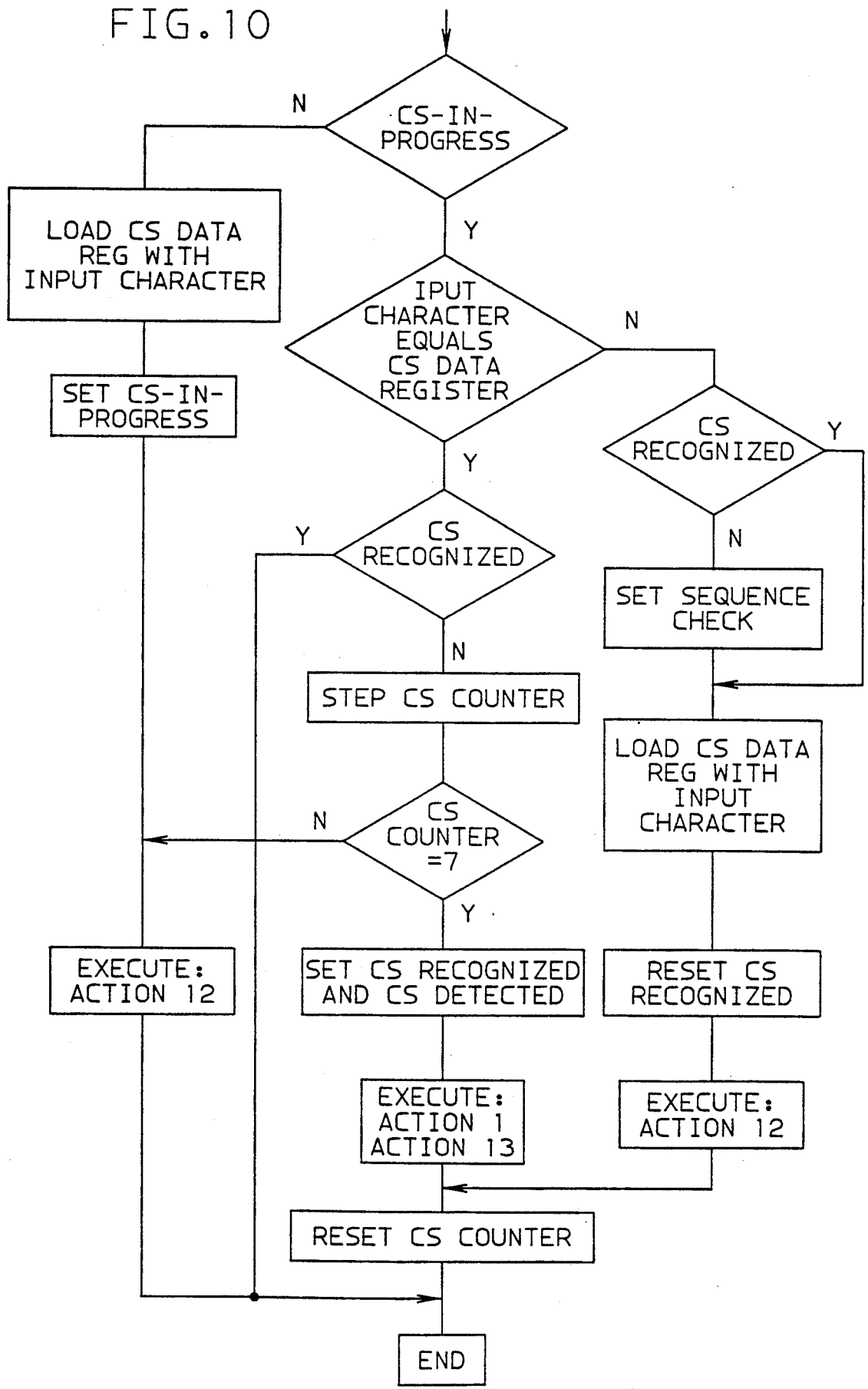
FIG. 10 is a flow chart of a routine to be followed upon the detection of a continuous sequence by the state machine of FIG. 8.

FIG. 10 is a flow chart showing the routine to be followed under action 5 of the state table of FIG. 9 when a continuous sequence is detected. The flow chart is self-explanatory to those skilled in the art, and will not be explained further.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. Apparatus for decoding frames from a data link, each frame having multiple data characters, said apparatus comprising:
   a frame input connected to said data link for the receipt thereon of a received frame from the data link;
   an expect/mask buffer, having a first portion for storing a reproduction of expected characters expected to be in said received frame, and a second portion for storing a mask indicating which bits of the characters of said received frame are to be compared to corresponding bits of said expected characters in the first portion;

compare means for comparing characters of said received frame to corresponding expected characters in the first portion of said expect/mask buffer as masked by said second portion;

a compare register connected to said compare means for storing the results of the comparison of said compare means;

a header buffer having multiple entries and being connected to said frame input, each entry thereof for storing characters of one of the frames received by said frame input; and a compare buffer having multiple entries and being connected to said compare register, each entry thereof for storing the contents of said compare register resulting from the comparison by said compare means for the corresponding frame entry in said header buffer.

2. The apparatus of claim 1 further comprising a state machine connected to said frame input, said state machine having a summary byte register and examining means for examining said received frame and providing a plurality of frame indicators to said summary byte register for storing said plurality of frame indicators therein as said received frame is examined by said examining means.

3. The apparatus of claim 2 wherein said state machine further comprises an alternate byte register for storing a plurality of error indicators and error detecting means for detecting errors in said received frame and providing a plurality of error indicators to said alternate compare byte register for storing said plurality of error indicators therein as said received frame is examined by said examining means.

4. The apparatus of claim 3 wherein said state machine further comprises an interface control check register for storing control checks, and control check detecting means for detecting control checks in said received frame and providing said control checks to said interface control check register for storing said control checks therein.

5. The apparatus of claim 3 wherein said header buffer has a data port and a write address port, said apparatus further comprising a header buffer write pointer connected to the write address port of said header buffer, said summary byte register being connected to the data port of said header buffer such that the contents of said summary byte register is written into a specified entry of said header buffer as determined by said header buffer write pointer after said received frame has been received by said frame input.

6. The apparatus of claim 5 wherein said compare buffer has a write address port and a data port, said apparatus further comprising a compare buffer write pointer connected to the write address port of said compare buffer and said alternate compare byte register being connected to the data port of said compare buffer for writing the contents of said alternate compare byte register into a specified entry of said compare buffer as determined by the contents of said header buffer write pointer, and write control means in said error detecting means for causing the contents of said alternate compare byte buffer to be written into said specified entry of said compare buffer instead of said compare register means when an error is detected in said received frame.

7. The apparatus of claim 6 wherein said header buffer has a read address port and said compare buffer has a read address port, said apparatus further comprising a header buffer read pointer connected to said read address port of said header buffer for reading the contents of a specified entry of said header buffer;

a microprocessor means connected to said header buffer read pointer for reading the contents of said header buffer for processing by said microprocessor means;

a compare buffer read pointer connected to the read address port of said compare buffer for reading the contents of a specified entry of said compare buffer as determined by said compare buffer read pointer for processing by said microprocessor means; and pointer compare means having a first input connected to said compare write buffer and a second input connected to said compare buffer read pointer for comparing the contents of said compare buffer write pointer and said compare buffer read pointer for determining if there are entries in said header buffer and compare buffer which is queued work that has not been read by said microprocessor means.

8. The apparatus of claim 7 further comprising an error code checking circuit connected to said frame input, said error code checking circuit having means for calculating an error code from the characters in said received frame and comparing the result with an error detecting code recorded in said received frame, said error code checking circuit having an output connected to said state machine for reporting a mismatch in the calculated error code and the recorded error code.

9. The apparatus of claim 1 wherein said received frame is a data frame including a header portion having multiple bytes, said apparatus further comprising data frame recognition means connected to said frame input for controlling which bytes of said header portion are compared by said compare means for detecting the receipt of a data frame.

10. The apparatus of claim 9 further comprising data buffer means connected to said frame input for storing data from the frame received by said frame input;

LOAD DATA BUFFER signal generating means in said data frame recognition means for generating a LOAD DATA BUFFER signal when a data frame is recognized; and state machine means connected to said LOAD DATA BUFFER signal generating means said state machine means for loading data from the data frame into said data buffer responsive to said LOAD DATA BUFFER signal.

11. The apparatus of claim 10 wherein said header portion includes a specific number of header bytes and a specific number of total bytes, and said data recognition circuit includes an X count register for containing a value equal to the number of said header bytes;

a Y count register for containing a value equal to the total number of bytes in said header portion; and compare control means connected to said X count and said Y count registers for allowing the comparison of bytes received by said frame input to be compared until the number of bytes received equals to the value contained in said X count register, and for preventing comparison of bytes received by said frame input when the number of bytes received is greater than the value contained in the X count register but less than the value contained in the Y count register.

12. The apparatus of claim 11 further comprising a DMASK register connected to said frame input, said DMASK register for masking the expect portion of said expect/mask buffer to determine if the contents of the frame received by said frame input is a data frame.

13. The apparatus of claim 8 further comprising a compare invalid register for containing multiple bits, each bit contained therein having a first state indicating that a compare is invalid and a second state indicating that the compare is valid;

a bit decoder connected to the write address port of said header buffer, said bit decoder for resetting to its second state, a bit corresponding to the address of said header buffer when the beginning of a frame is received by said frame input means; and bit selector means connected to the read address input of said compare buffer for selecting the bit of said compare invalid register which corresponds to the read address of said compare buffer such that the bit selected by said bit selector indicates if the entry in said compare buffer is valid or invalid.

\* \* \* \* \*